United States Patent
Ito et al.

(10) Patent No.: US 9,471,298 B2
(45) Date of Patent: Oct. 18, 2016

(54) INFORMATION PROCESSING APPARATUS, CONTROL METHOD, AND STORAGE MEDIUM

(71) Applicant: FUJITSU LIMITED, Kawasaki-shi, Kanagawa (JP)

(72) Inventors: Hidenobu Ito, Kawasaki (JP); Takuya Sakamoto, Kawasaki (JP); Yosuke Nakamura, Kawasaki (JP); Koichi Yasaki, Kawasaki (JP); Kazuaki Nimura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/721,364

(22) Filed: May 26, 2015

(65) Prior Publication Data
US 2015/0254069 A1     Sep. 10, 2015

Related U.S. Application Data

(63) Continuation of application No. PCT/JP2013/000367, filed on Jan. 24, 2013.

(51) Int. Cl.
| | |
|---|---|
| G06F 9/445 | (2006.01) |
| G06F 9/44  | (2006.01) |
| G06F 13/00 | (2006.01) |
| H04M 1/00  | (2006.01) |
| H04M 1/725 | (2006.01) |

(52) U.S. Cl.
CPC .............. G06F 8/62 (2013.01); G06F 13/00 (2013.01); H04M 1/00 (2013.01); H04M 1/72522 (2013.01)

(58) Field of Classification Search
USPC ........................................................ 717/174
See application file for complete search history.

(56) References Cited

U.S. PATENT DOCUMENTS

| | | | | |
|---|---|---|---|---|
| 7,451,103 | B1* | 11/2008 | Boyle | G06Q 20/10 705/35 |
| 7,779,408 | B1* | 8/2010 | Papineau | H04W 4/00 709/219 |
| 8,099,332 | B2* | 1/2012 | Lemay | G06F 8/61 705/26.1 |
| 8,235,529 | B1* | 8/2012 | Raffle | A61B 3/113 351/209 |

(Continued)

FOREIGN PATENT DOCUMENTS

| | | |
|---|---|---|
| JP | 2002-100158 A | 4/2002 |
| JP | 2002-366319 A | 12/2002 |

(Continued)

OTHER PUBLICATIONS

Written Opinion issued Apr. 23, 2013 in PCT/JP2013/000367 filed Jan. 24, 2013 with English translation.

(Continued)

Primary Examiner — Marina Lee
(74) Attorney, Agent, or Firm — Oblon, McClelland, Maier & Neustadt, L.L.P.

(57) ABSTRACT

A control method executed by an information processing apparatus, the control method includes deleting an application that is installed in the information processing apparatus; displaying a locked screen for which operation is limited; displaying an unlocked screen indicating a confirmation request for confirming that the application is deleted, when an input for releasing the operation limit for the locked screen is detected; and releasing the operation limit for the screen, when a response for the confirmation request is received.

11 Claims, 15 Drawing Sheets

(56) References Cited

U.S. PATENT DOCUMENTS

| | | | |
|---|---|---|---|
| 8,332,356 B2* | 12/2012 | Thergaonkar | G06F 8/65 707/633 |
| 8,751,321 B2* | 6/2014 | Lemay | G06F 8/61 705/26.1 |
| 9,230,059 B2* | 1/2016 | Oh | G06F 19/3406 |
| 2007/0038763 A1* | 2/2007 | Oestvall | G06F 1/3203 709/229 |
| 2008/0057894 A1* | 3/2008 | Aleksic | H02J 9/002 455/187.1 |
| 2009/0138387 A1* | 5/2009 | Boyle | G06Q 20/10 705/30 |
| 2009/0307105 A1* | 12/2009 | Lemay | G06F 8/61 705/26.1 |
| 2010/0017505 A1* | 1/2010 | Kamada | G06F 8/62 709/221 |
| 2011/0258301 A1* | 10/2011 | McCormick | H04L 67/34 709/222 |
| 2012/0117504 A1* | 5/2012 | Lemay | G06F 8/61 715/772 |
| 2013/0135204 A1* | 5/2013 | Raffle | A61B 3/113 345/158 |
| 2013/0293456 A1* | 11/2013 | Son | G06F 3/013 345/156 |
| 2015/0033361 A1* | 1/2015 | Choi | G06F 21/60 726/27 |
| 2015/0063723 A1* | 3/2015 | Oh | G06F 19/321 382/305 |
| 2015/0208129 A1* | 7/2015 | Wang | H04N 21/42213 725/37 |
| 2015/0254069 A1* | 9/2015 | Ito | G06F 13/00 717/174 |

FOREIGN PATENT DOCUMENTS

| | | |
|---|---|---|
| JP | 2003 216374 A | 7/2003 |
| JP | 2003-296529 A | 10/2003 |
| JP | 2004-170636 A | 6/2004 |
| JP | 2007-164604 A | 6/2007 |
| WO | WO 2012/153787 A1 | 11/2012 |

OTHER PUBLICATIONS

International Search Report issued Apr. 23, 2013 in PCT/JP2013/000367 filed Jan. 24, 2013.

* cited by examiner

| APPLICATION ID | APPLICATION NAME | ICON FILE |
|---|---|---|
| 1 | MEETING MATERIAL 1 | data/homeapp/dellist/1/icon.gif |
| 2 | MEETING MATERIAL 2 | data/homeapp/dellist/2/icon.gif |
| ... | ... | ... |

| APPLICATION ID | APPLICATION NAME | ICON FILE | LOCATION INFORMATION |
|---|---|---|---|
| 1 | MEETING MATERIAL 1 | data/homeapp/dellist/1/icon.gif | aa |
| 2 | MEETING MATERIAL 2 | data/homeapp/dellist/2/icon.gifb | bb |
| ... | ... | ... | ... |

INFORMATION PROCESSING APPARATUS, CONTROL METHOD, AND STORAGE MEDIUM

CROSS-REFERENCE TO RELATED APPLICATION

This application is a continuation application of International Application PCT/JP2013/000367 filed on Jan. 24, 2013, the entire contents of which are incorporated herein by reference.

FIELD

The embodiments discussed herein are related to an information processing apparatus, a control method, and a storage medium.

BACKGROUND

For example, a mechanism has been developed in which a portable information terminal automatically downloads or automatically deletes an application program (hereinafter, referred to as an application) and various data such as office documents or images and videos, in response to an instruction from a server.

Such a mechanism is used even in a service that automatically delivers applications to the portable information terminal, depending on, for example, the situation (context) of the user of the portable information terminal. For example, in such a service, when the user enters a meeting room, meeting material is automatically distributed to the portable information terminal. Then, after the meeting has been completed and the user has left the meeting room, the meeting material is deleted from the portable information terminal. According to this mechanism, it is possible to inhibit the leakage of important information such as the meeting material in advance.

As a mechanism for deleting digital data, a recording and playback apparatus is disclosed which outputs a message screen and notifies the user of the message screen, when there is, for example, data that has been recorded but not yet played. As the related art, for example, Japanese Laid-open Patent Publication No. 2002-100158 and the like are disclosed.

However, the automatic deletion of an application does not involve the operation of the user of the portable information terminal. Therefore, when the application is automatically deleted while the user is not aware of the deletion, the user of the portable information terminal feels very anxious about whether or not the application has been deleted from his or her portable information terminal. Only displaying a message when the application is automatically deleted does not enable the user to fully realize that the application has been deleted and may not relieve the anxiety of the user. Moreover, the user may miss the display of the message.

The occurrence of such a problem is not limited to the automatic application delivery service. For example, the problem commonly occurs in a system in which the application of the portable information terminal is automatically deleted in response to an instruction from the outside such as a server. It is desirable for a user to fully realize the deletion of the application program.

SUMMARY

According to an aspect of the invention, a control method executed by an information processing apparatus, the control method includes deleting an application that is installed in the information processing apparatus; displaying a locked screen for which operation is limited; displaying an unlocked screen indicating a confirmation request for confirming that the application is deleted, when an input for releasing the operation limit for the locked screen is detected; and releasing the operation limit for the screen, when a response for the confirmation request is received.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a schematic diagram of a deleted application information DB according to the first embodiment;

FIG. 15 is a schematic diagram of a deleted application information DB according to the sixth embodiment.

DESCRIPTION OF EMBODIMENTS

First Embodiment

Hereinafter, a first embodiment will be described with reference to FIG. 1 to FIG. 9.

Figure 1:
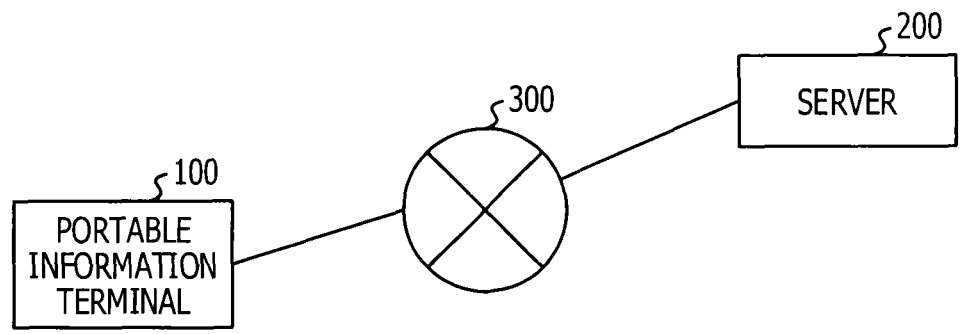
FIG. 1 is a schematic diagram of an automatic application delivery system according to a first embodiment.

FIG. 1 is a schematic diagram illustrating an automatic application delivery system according to the first embodiment.

As illustrated in FIG. 1, the automatic application delivery system according to the present embodiment includes a portable information terminal 100, a server 200, and a network 300. The portable information terminal 100 and the server 200 are interconnected through the wired or wireless network 300. The portable information terminal is an example of an information processing apparatus.

Figure 2:
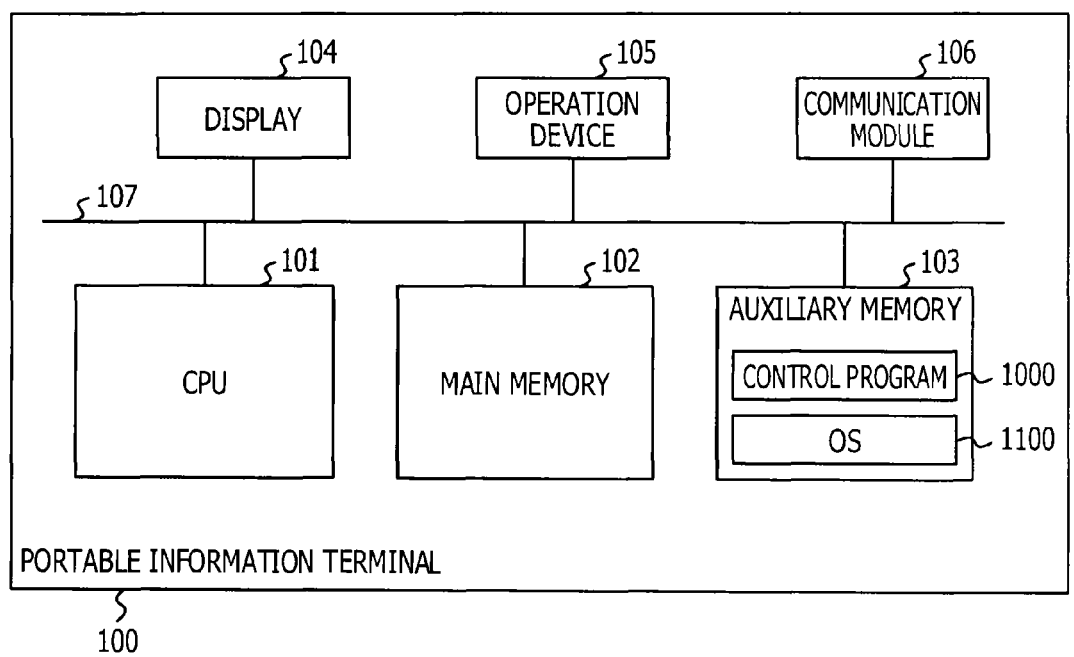
FIG. 2 is a schematic diagram of a hardware configuration of a portable information terminal according to the first embodiment.

FIG. 2 is a schematic diagram illustrating a hardware configuration of the portable information terminal 100 according to the first embodiment.

As illustrated in FIG. 2, the portable information terminal 100 according to the present embodiment includes a central processing unit (CPU) 101, a main memory 102, an auxiliary memory 103, a display 104, an operation device 105, and a communication module 106, as hardware modules. The hardware modules are interconnected through a bus 107. In the present embodiment, for example, a smart phone, a tablet, a notebook computer, and the like are assumed as the portable information terminal 100. However, the present embodiment is not limited thereto.

The CPU 101 controls various hardware modules of the portable information terminal 100. The CPU 101 reads the various programs stored in the auxiliary memory 103 to the main memory 102. Then, the CPU 101 executes various functions, by executing various programs that have been read to the main memory 102. The details of the various functions will be described later.

The main memory 102 stores various programs executed by the CPU 101. The main memory 102 is used as a work area for the CPU 101, and stores various types of data used for processing by the CPU 101. The main memory 102 is, for example, a random access memory (RAM), and the like.

The auxiliary memory 103 stores various programs for operating the portable information terminal 100. The various programs include, for example, application programs such as a control program 1000 executed by the portable information terminal 100, or an OS 1100 which is an execution environment for the application program. The auxiliary memory 103 is, for example, a non-volatile memory such as a hard disk or a flash memory.

The display 104 displays various screens such as, for example, a home screen in which the operation on the portable information terminal 100 is not limited, a locked screen in which the operation on the portable information terminal 100 is limited, and an unlocked screen for releasing the operation limit on the portable information terminal 100. Here, the operation is, for example, an input operation performed on the portable information terminal 100 by the user.

The operation device 105 is a device for receiving an operation input to the portable information terminal 100. The operation device 105 is, for example, a touch screen, various buttons, a camera, a microphone, an acceleration sensor, a gyro sensor, an illuminance meter, a barometer, or the like.

The communication module 106 receives various instructions from the server 200, for example, a delivery command, a delete command, an update command, and the like. The communication module 106 transmits various notifications to the server 200, for example, an application distribution completion notification, an application delete completion notification, an application update completion notification, a deletion confirmation completion notification, and the like.

The delivery command is a command instructing the portable information terminal 100 to install an application, the delete command is a command instructing the portable information terminal 100 to delete the application, and the update command is a command instructing the portable information terminal 100 to update the application.

Figure 3:
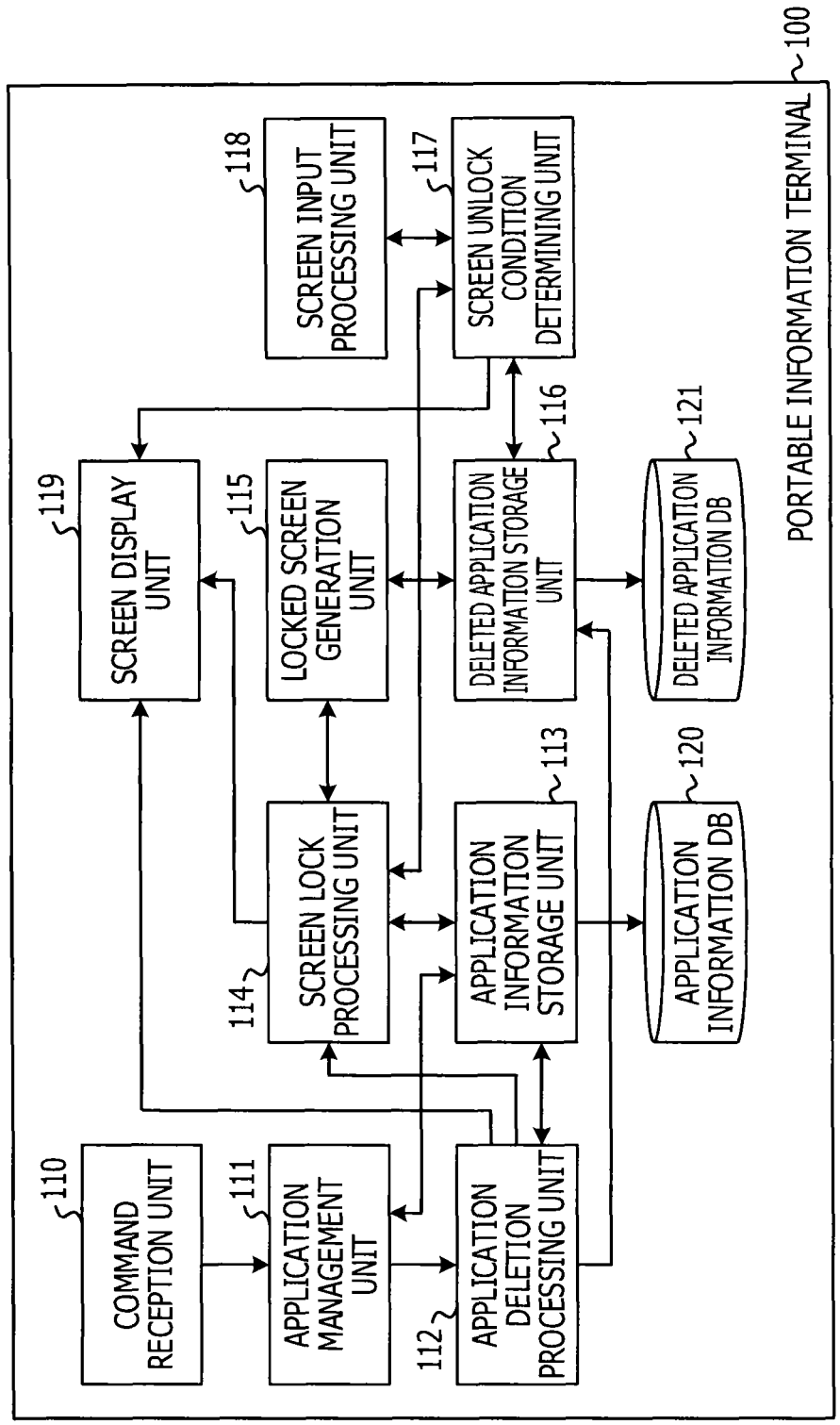
FIG. 3 is a schematic diagram of functional blocks in the portable information terminal according to the first embodiment.

FIG. 3 is a schematic diagram of functional blocks in the portable information terminal 100 according to the first embodiment.

As illustrated in FIG. 3, the portable information terminal 100 according to the present embodiment includes a command reception unit 110, an application management unit 111, an application deletion processing unit 112, an application information storage unit 113, a screen lock processing unit 114, a locked screen generation unit 115, a deleted application information storage unit 116, a screen unlock condition determining unit 117, a screen input processing unit 118, a screen display unit 119, an application information DB 120, and a deleted application information DB 121, as processing units.

Any of the command reception unit 110, the application management unit 111, the application deletion processing unit 112, the application information storage unit 113, the screen lock processing unit 114, the locked screen generation unit 115, the deleted application information storage unit 116, the screen unlock condition determining unit 117, the screen input processing unit 118, the screen display unit 119, the application information DB120, and the deleted application information DB 121 is realized by the CPU 101 reading the control program 1000 to the main memory 102 and executing the control program 1000 that has been read in the main memory 102. The application information DB 120 and the deleted application information DB 121 are constructed in a storage device, for example, such as the main memory 102 or the auxiliary memory 103.

The command reception unit 110 receives various commands (instructions) from the server 200. The command reception unit 110 assigns the processes to respective processing units, based on the commands from the server 200. For example, when the command from the server 200 is the delete command, the command reception unit 110 assigns an application delete process to the application deletion processing unit 112.

The application management unit 111 manages the applications installed in the portable information terminal 100 or various types of information regarding the installed applications (hereinafter, referred to as application information). For example, when the command from the server 200 is the delete command, the application management unit 111 determines whether or not there is an application to be deleted (hereinafter, referred to as a deleted application). When the command from the server 200 is determined as the delivery command, the application management unit 111 instructs the application information storage unit 113 to store the application information about the application to be delivered (hereinafter, referred to as a new application). The application information includes, for example, overall resources such as an application name, an icon, a storage location, and the entire application program.

The application deletion processing unit 112 executes the application delete process that is assigned from the command reception unit 110. Specifically, the application deletion processing unit 112 instructs the screen lock processing unit 114 to lock a screen. The application deletion processing unit 112 instructs the application information storage unit 113 to acquire and delete the application information regarding the deleted application. The application deletion processing unit 112 instructs the deleted application information storage unit 116 to register the deleted application information.

The application information storage unit 113 manages the application information that has been installed in the portable information terminal 100. For example, when receiving a storage instruction of the new application from the application management unit 111, the application information storage unit 113 stores the application information regarding the new application in the application information DB 120. When receiving the application delete instruction from the application deletion processing unit 112, the application information storage unit 113 deletes the application information regarding the application, from the application information DB 120.

The screen lock processing unit 114 instructs the locked screen generation unit 115 to generate a locked screen or an unlocked screen of the portable information terminal 100. When the locked screen or the unlocked screen is displayed on the display 104, the screen lock processing unit 114 controls the screen lock of the portable information terminal 100, that is, the reception of the input operation on the portable information terminal 100. However, the screen lock may be started before, at the same time as, or after display of the locked screen or the unlocked screen. The screen lock processing unit 114 instructs the screen display unit 119 to display the home screen, based on deletion confirmation from the screen unlock condition determining unit 117.

The locked screen generation unit 115 generates a locked screen and an unlocked screen, based on the instruction from the screen lock processing unit 114. The locked screen includes, for example, a lock icon. The unlocked screen includes, for example, a deleted application icon, and a recycle bin icon.

The deleted application information storage unit 116 manages application information such as the application name and the icon of the deleted application. For example, the deleted application information storage unit 116 stores the application information such as the application name and the icon of the deleted application that the application deletion processing unit 112 has deleted from the application information storage unit 113, in the deleted application information DB 121.

The screen unlock condition determining unit 117 determines whether or not the user has performed deletion confirmation of the deleted application. If it is determined that the deletion confirmation of deleted application has been performed, the screen unlock condition determining unit 117 instructs the screen lock processing unit 114 to release the screen lock.

The screen input processing unit 118 detects an input operation performed on the portable information terminal 100, for example, screen touching, button input, and the like.

The screen display unit 119 displays various screens, for example, the home screen, the locked screen, the unlocked screen, and the like on the display 104 of the portable information terminal 100.

The application information DB 120 stores the application information regarding all applications that have been installed in the portable information terminal 100.

The deleted application information DB 121 stores the application information such as the application name and the icons of the deleted application.

FIG. 4 is a schematic diagram of the deleted application information DB 121 according to the first embodiment.

As illustrated in FIG. 4, in the deleted application information DB 121 according to the present embodiment, the application ID, the application name, and the icon file of the deleted application are associated. The application ID is the identification number of the deleted application. The application name is the name of the deleted application. The icon file is the storing location (path) of the deleted application.

Figure 5:
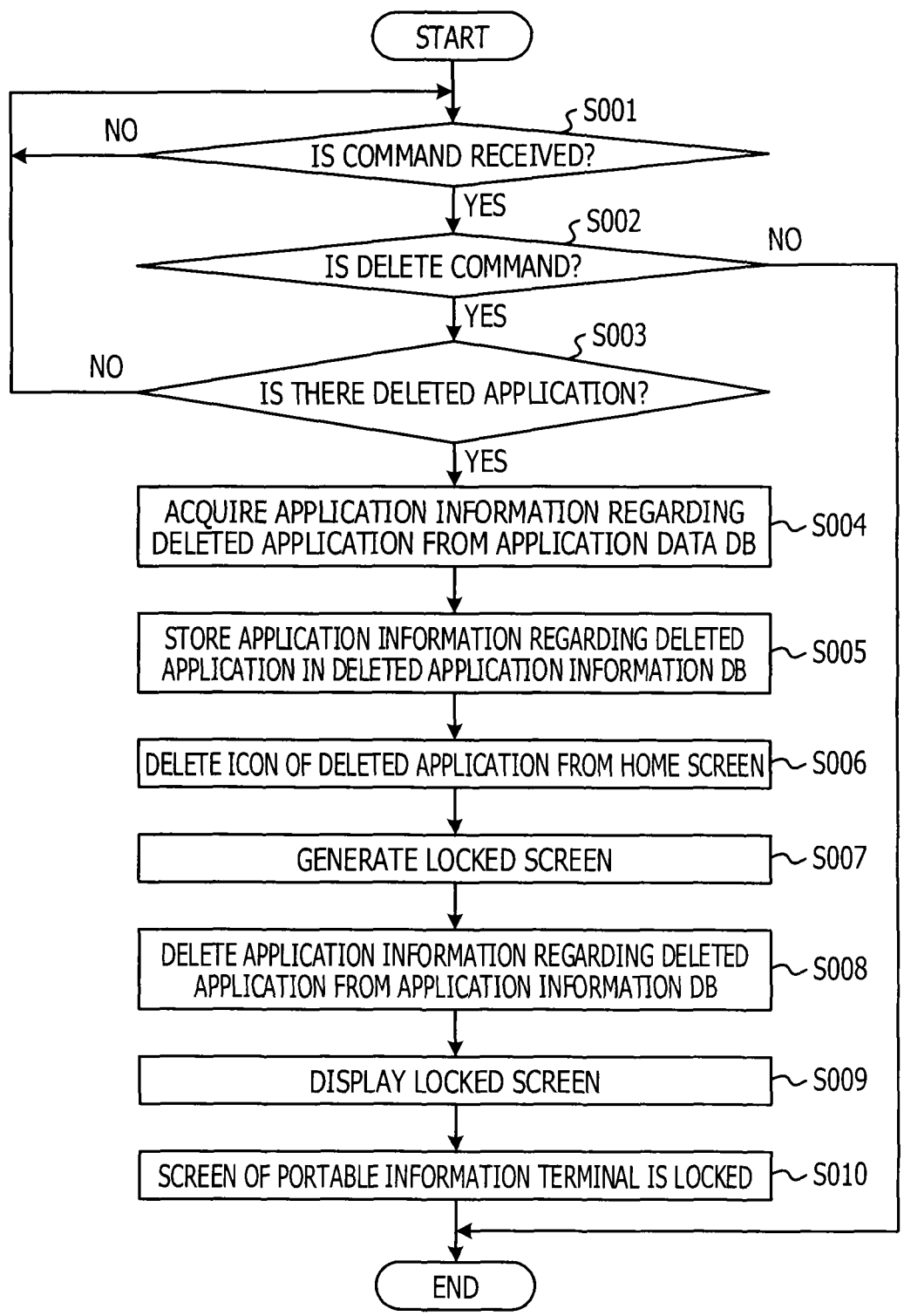
FIG. 5 is a flowchart of a screen locking process by the portable information terminal according to the first embodiment.

FIG. 5 is a flowchart of a screen locking process by the portable information terminal 100 according to the first embodiment.

As illustrated in FIG. 5, the command reception unit 110 determines whether or not a command has been received from the server 200 (S001).

When it is not determined that a command has been received (No in S001), the command reception unit 110 determines whether or not a command has been received from the server 200 (S001) again.

In contrast, when it is determined that a command has been received (Yes in S001), the command reception unit 110 determines whether or not the command is a delete command (S002).

When it is not determined that the command is a delete command (No in S002), the command reception unit 110 ends a screen lock process.

In contrast, when it is determined that the command is a delete command (Yes in S002), the application management unit 111 determines whether or not there is a deleted application (S003).

When it is not determined that there is a deleted application (No in S003), the command reception unit 110 determines whether or not a command has been received from the server 200 (S001) again.

In contrast, when it is determined that there is a deleted application (Yes in S003), the application information storage unit 113 acquires the application information regarding the deleted application from the application information DB 120 (S004).

Subsequently, the deleted application information storage unit 116 stores the application information regarding the deleted application, for example, the application ID, the application name, the icon file, and the like that has been acquired from the application information storage unit 113, in the deleted application information DB 121 (S005).

Subsequently, the application deletion processing unit 112 instructs the screen display unit 119 to delete the icon of the application. The screen display unit 119 displays the home screen after the deletion of the icon of the application on the display 104 (S006).

Subsequently, the locked screen generation unit 115 generates a locked screen in which operation input to the portable information terminal 100 is limited (S007). The locked screen includes, for example, an icon indicating that the screen is locked, for example, an icon such as a lock-type icon (hereinafter referred to as lock icon).

Subsequently, the application deletion processing unit 112 deletes the application information regarding the deleted application from the application information DB 120 (S008).

Subsequently, the screen display unit 119 displays the locked screen on the display 104 (S009). However, the screen display unit 119 may display the locked screen, before the application deletion processing unit 112 deletes the application information regarding the deleted application from the application information DB 120.

Subsequently, the screen lock processing unit 114 locks the screen of the portable information terminal 100, and limits the reception of the operation input to the portable information terminal 100 (S010). The screen lock processing unit 114 may limit not only the operation input from the touch screen which is the operation device 105, but also the operation input from, for example, various buttons, a microphone, an acceleration sensor, a gyro sensor, an illuminance meter, a barometer, and the like.

If the portable information terminal 100 according to the present embodiment receives the delete command of the application from the server 200, it executes the above process so as to limit the operation input to the portable information terminal 100.

Figure 6:
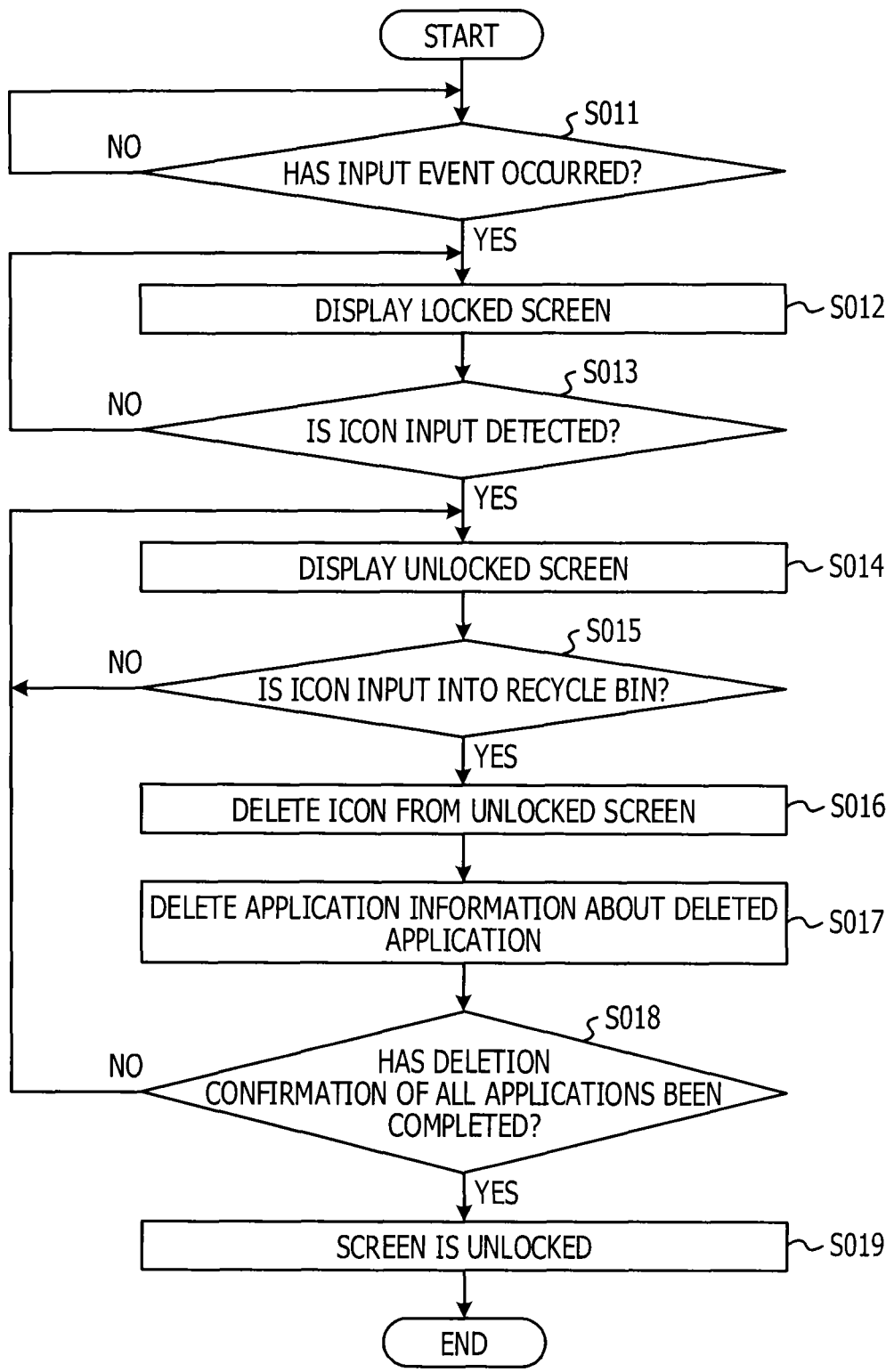
FIG. 6 is a flowchart of a screen unlocking process by the portable information terminal according to the first embodiment.

FIG. 6 is a flowchart of a screen unlocking process by the portable information terminal 100 according to the first embodiment. FIGS. 7A to 7D are schematic diagrams of screen transitions of the portable information terminal 100 according to the first embodiment. All of the letters (A, B, C, D, E, F, G, H, I) illustrated in FIGS. 7A to 7D are application icons.

Figure 7A:
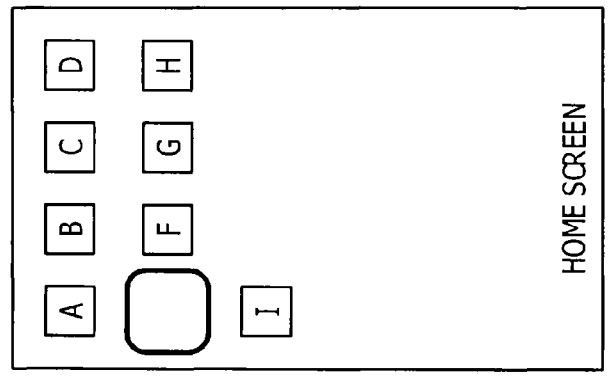
FIGS. 7A, 7B, 7C and 7D are schematic diagrams of screen transition of the portable information terminal according to the first embodiment.

Here, as illustrated in FIG. 7A, the icon E of the application surrounded by a frame line is assumed to be deleted.

As illustrated in FIG. 6, the screen input processing unit 118 determines whether or not an input event has occurred, for example, based on input information from the operation device 105 (S011).

When it is not determined that the input event has occurred (No in S011), the screen input processing unit 118 determines whether or not the input event has occurred (S011) again.

Figure 7B:
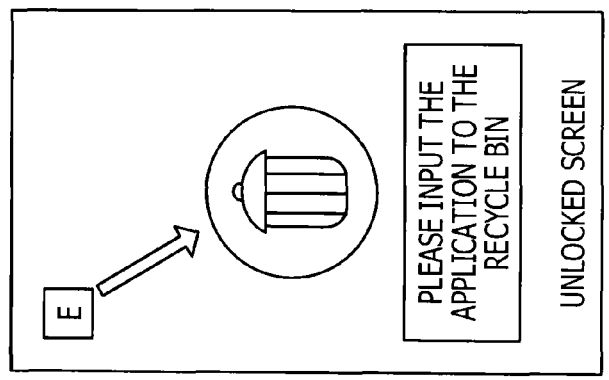

In contrast when it is determined that the input event has occurred (Yes in S011), as illustrated in FIG. 7B, the screen display unit 119 displays the locked screen in which the operation input to the portable information terminal 100 is limited, on the display 104 (S012). The locked screen according to the present embodiment includes, for example, the lock icon indicating that the screen is locked.

Subsequently, the screen unlock condition determining unit 117 determines whether or not an icon input has been detected, based on input information from the screen input processing unit 118 (S013). In the present embodiment, the screen unlock condition determining unit 117 determines whether touching (tapping) of the lock icon has been detected as the unlock input. However, the unlock input is not limited to the touching of the lock icon. For example, a portable information terminal having a fingerprint sensor may regard an input to the fingerprint sensor as the unlock input.

When it is not determined that the unlock input has been detected (No in S013), that is, when touching (tapping) of the lock icon has not been detected, the screen display unit 119 displays the locked screen on the display 104 (S012) again.

Figure 7C:
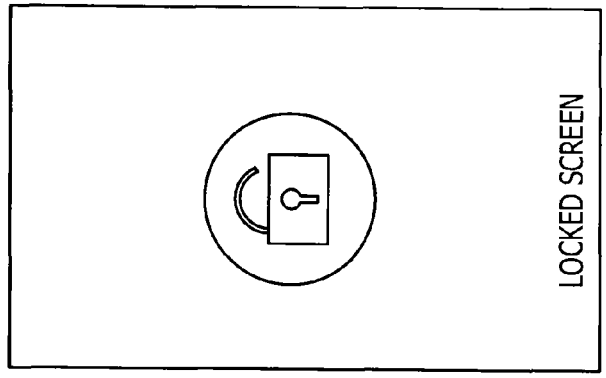

In contrast, when it is determined that the unlock input has been detected (Yes in S013), that is, when touching (tapping) of the lock icon has been detected, as illustrated in FIG. 7C, the screen display unit 119 displays an unlocked screen for unlocking the screen lock, on the display 104 (S014). At this time, the locked screen generation unit 115 may instruct the screen display unit 119 to display, for example, a message prompting deletion confirmation of an application such as "Please put the application into the recycle bin".

Specifically, the locked screen generation unit 115 acquires the application information regarding the deleted application that is stored in the deleted application information DB 121, from the deleted application information storage unit 116. For example, if FIG. 4 is referred to, when "meeting material 1" has been deleted, the locked screen generation unit 115 extracts the application information regarding the deleted application, for example, information regarding an application name and information regarding an icon, based on "/data/homeapp/dellist/1/icon.gif" that is the storing location (path) associated with the "meeting material 1". Subsequently, the locked screen generation unit 115 deletes the lock icon from the locked screen. Then, the locked screen generation unit 115 generates an unlocked screen by adding a deleted application icon and a recycle bin icon to the locked screen.

Subsequently, the screen unlock condition determining unit 117 determines whether or not the deleted application icon has been dragged (moved) to the recycle bin icon, based on the input information from the screen input processing unit 118 (S015). The user of the portable information terminal 100 may confirm that the application has been deleted by performing the operation of moving the delete icon to the recycle bin icon. Therefore, the operation of moving the deleted application icon to the recycle bin icon is assumed as the user's deletion confirmation.

When it is not determined that the deleted application icon has been moved to the recycle bin icon (No in S105), the screen display unit 119 displays the unlocked screen on the display 104 (S014) again.

In contrast, when it is determined that the deleted application icon has been moved into the recycle bin icon (Yes in S015), the locked screen generation unit 115 deletes the deleted application icon from the unlocked screen. Subsequently, the screen display unit 119 displays an unlocked screen obtained by deleting the deleted application icon, on the display 104 (S016).

Subsequently, the application deletion processing unit 112 instructs the deleted application information storage unit 116 to delete the application information about the deleted application from the deleted application information DB 121 (S017).

Subsequently, the screen unlock condition determining unit 117 determines whether or not the deletion confirmation of all of the deleted applications has been completed (S018). The deleted application is displayed on all of the unlocked screens. Therefore, if the deletion confirmation of all of the deleted applications has been completed, all of the icons are deleted excluding the recycle bin icon.

Here, when it is not determined that the deletion confirmation of all of the deleted applications has been completed (No in S018), the screen display unit 119 displays the unlocked screen on the display 104 (S014) again.

When the on-going deletion confirmation of the deleted applications is interrupted, in other words, when the screen unlocking process is interrupted while the deletion confirmation of any deleted applications is being completed, if the unlocked screen is displayed again, the deletion confirmation may be resumed from the interrupted state, in other words, from the state where the deletion confirmation is not completed and only the deleted application icon is displayed.

In contrast, when it is determined that the deletion confirmation of all of the deleted applications has been completed (Yes in S018), the screen lock processing unit 114 releases the screen lock, that is, unlocks the screen (S019). By doing so, as illustrated in FIG. 7D, the home screen in which the operation input to the portable information terminal 100 is not limited is displayed on the display 104.

Figure 7D:
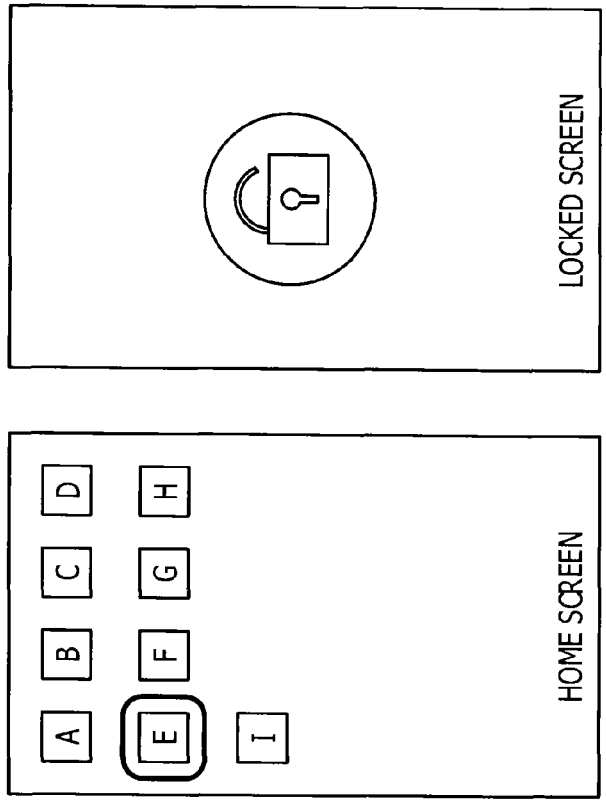

Here, if FIG. 7A and FIG. 7D are compared, as indicated by the frame line, an application icon E is deleted. Therefore, when many application icons are present on the home screen or when the home screen has a plurality of pages, the user may not notice that the icon has been deleted.

However, in the present embodiment, as illustrated in FIG. 7C, if the user does not drag (see the arrow) the deleted application icon E to the recycle bin icon, the screen lock of the portable information terminal 100 is not released. Therefore, the user of the portable information terminal 100 inevitably performs an operation of dragging the application icon E to the recycle bin icon, that is, the deletion confirmation. Accordingly, since the user of the portable information terminal 100 feels that the application has been deleted, for example, even if the application is automatically deleted based on the delete command from the server 200, the user really feels anxious about whether or not the application has been deleted from the portable information terminal 100.

In addition, in the present embodiment, the operation of dragging the deleted application icon to the recycle bin icon is used as the deletion confirmation. Therefore, if the user of the portable information terminal 100 does not consciously perform the screen operation, the deletion confirmation may not be performed. Accordingly, for example, it is possible to avoid a so-called inadvertent unlock in which a user's unintentional touching of the screen is regarded as execution of the deletion confirmation.

Figure 8:
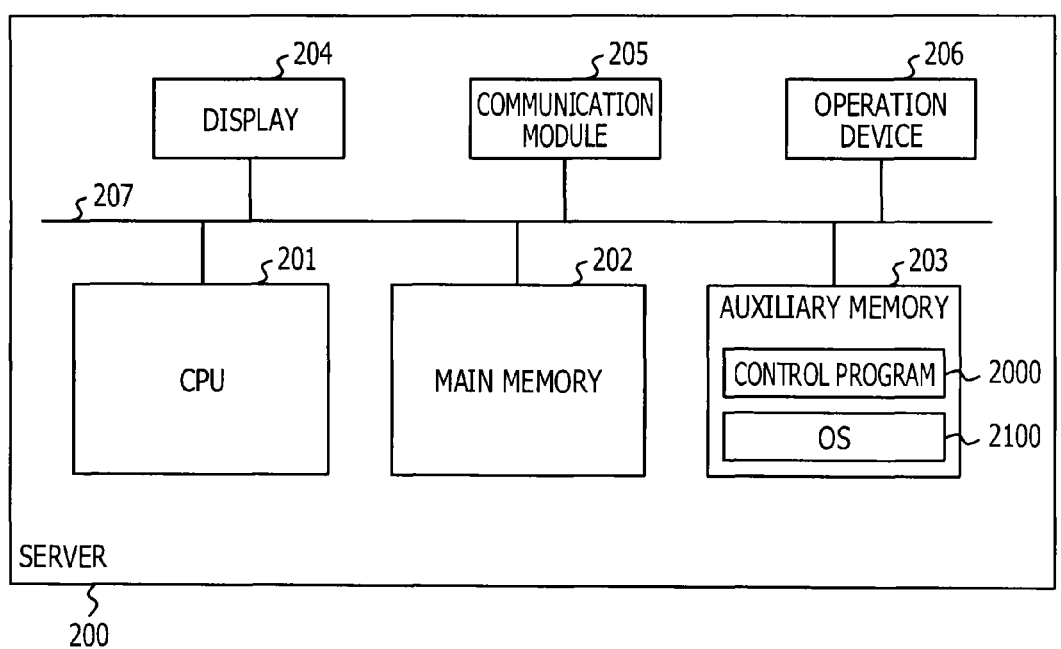
FIG. 8 is a schematic diagram of a hardware configuration of a server according to the first embodiment.

FIG. 8 is a schematic diagram of a hardware configuration of the server 200 according to the first embodiment.

As illustrated in FIG. 8, the server 200 according to the present embodiment includes a CPU 201, a main memory 202, an auxiliary memory 203, a display 204, a communication module 205, and an operation device 206, as hardware modules. The hardware modules are interconnected through a bus 207.

The CPU 201 controls various hardware modules of the server 200. The CPU 201 reads the various programs stored in the auxiliary memory 203 to the main memory 202. Then, the CPU 201 executes various functions, by executing various programs that have been read to the main memory 202. The details of the various functions will be described later.

The main memory 202 stores various programs executed by the CPU 201. The main memory 202 is used as a work area for the CPU 201, and stores various types of data used for processing by the CPU 201. The main memory 202 is, for example, a RAM, or the like.

The auxiliary memory 203 stores various programs for operating the server 200. The various programs include, for example, application programs such as a control program 2000 executed by the server 200, or an OS 2100 which is an execution environment for the application program. The auxiliary memory 203 is, for example, a non-volatile memory such as a hard disk or a flash memory.

The communication module 205 receives various notifications from the portable information terminal 100. The communication module 205 transmits various commands to the portable information terminal 100.

Figure 9:
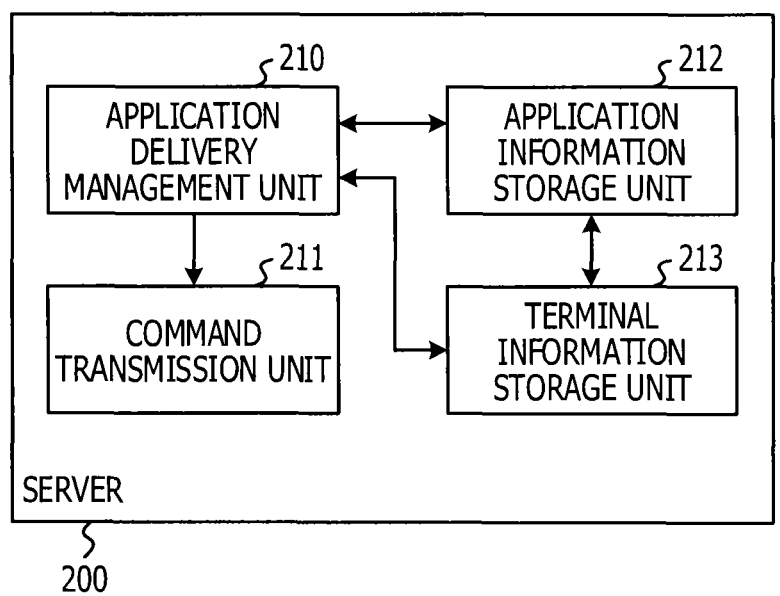
FIG. 9 is a schematic diagram of functional blocks in the server according to the first embodiment.

FIG. 9 is a schematic diagram of functional blocks in the server 200 according to the first embodiment.

As illustrated in FIG. 9, the server 200 according to the present embodiment includes an application delivery management unit 210, a command transmission unit 211, an application information storage unit 212, and a terminal information storage unit 213, as processing units.

Any of the application delivery management unit 210, the command transmission unit 211, the application information storage unit 212, and the terminal information storage unit 213 is realized by the CPU 201 reading the control program 2000 to the main memory 202 and executing the control program 2000 that has been read in the main memory 202.

The application delivery management unit 210 manages the portable information terminal 100 that delivers, deletes, or updates the application. The application delivery management unit 210 manages the application to be delivered to, deleted from, or updated in the portable information terminal 100. In other words, the application delivery management unit 210 manages which application is to be delivered to, deleted from, or updated in the portable information terminal 100.

The command transmission unit 211 transmits, for example, a delivery command, a delete command, an update command, or the like to the portable information terminal 100, based on the instruction from the application delivery management unit 210. The delivery command is a command instructing the portable information terminal 100 to install the application. The delete command is a command instructing the portable information terminal 100 to delete the application. The update command is a command instructing the portable information terminal 100 to update the application.

The application information storage unit 212 manages application information regarding the application to be delivered to, deleted from, or updated in the portable information terminal 100. The terminal information storage unit 213 manages terminal information regarding the portable information terminal 100 that delivers, deletes, or updates the application. The terminal information is, for example, a device ID of the portable information terminal 100, a user ID, and the like.

In the present embodiment, an automatic application delivery system is illustrated. However, the present embodiment is not limited to the automatic application delivery system. For example, as long as the portable information terminal 100 deletes the application, based on an instruction from the outside of the portable information terminal 100, the present embodiment may also be applied to any system. Here, "outside" is assumed to include a watchdog timer and the like that is provided in the portable information terminal 100. In other words, the watchdog timer may be provided inside the portable information terminal 100, and the watchdog timer may instruct the command reception unit 110, for example, to delete the application, and the like, based on the time measured by the watchdog timer.

In the present embodiment, it is assumed that the application is deleted (automatically deleted) regardless of the presence or absence of an operation by the user, for example, based on the instruction from the server 200. However, the present embodiment is not limited thereto. For example, the present embodiment may be also applied to the case where the application is installed (automatically installed) regardless of the presence or absence of an operation by the user, based on the instruction from the server 200. If the present embodiment is applied, the user of the portable information terminal 100 may fully recognize that the application is automatically installed.

In the present embodiment, the operation of dragging the deleted application icon to the recycle bin icon is used as the deletion confirmation. However, the present embodiment is not limited thereto. For example, tapping, double-clicking, or the like of the deleted application icon may be used as the deletion confirmation.

The present embodiment causes the user to perform the deletion confirmation and realize the deletion of the application, but the present embodiment is not intended to prohibit, for example, the display of a message or animation representing the deletion of the application, or another display. For example, displaying the swollen recycle bin icon on the locked screen may cause the user to recognize the deletion of the application.

In the present embodiment, the deleted application icon is displayed on the unlocked screen. However, the present embodiment is not limited thereto. For example, x marks may be added on the deleted application icon, and the x mark-added icon may be displayed on the home screen. For example, when the x mark-added icon is tapped (touched), or moved (dragged) to the recycle bin icon, it may be deleted from the home screen.

In the present embodiment, the control program 1000 is stored in the auxiliary memory 103. However, the control program 1000 may be stored, for example, in a portable memory such as a USB memory or a ROM.

Second Embodiment

Hereinafter, a second embodiment will be described with reference to FIG. 10. However, it is assumed that the description of the same components and operations as in the first embodiment will be omitted.

Figure 10:
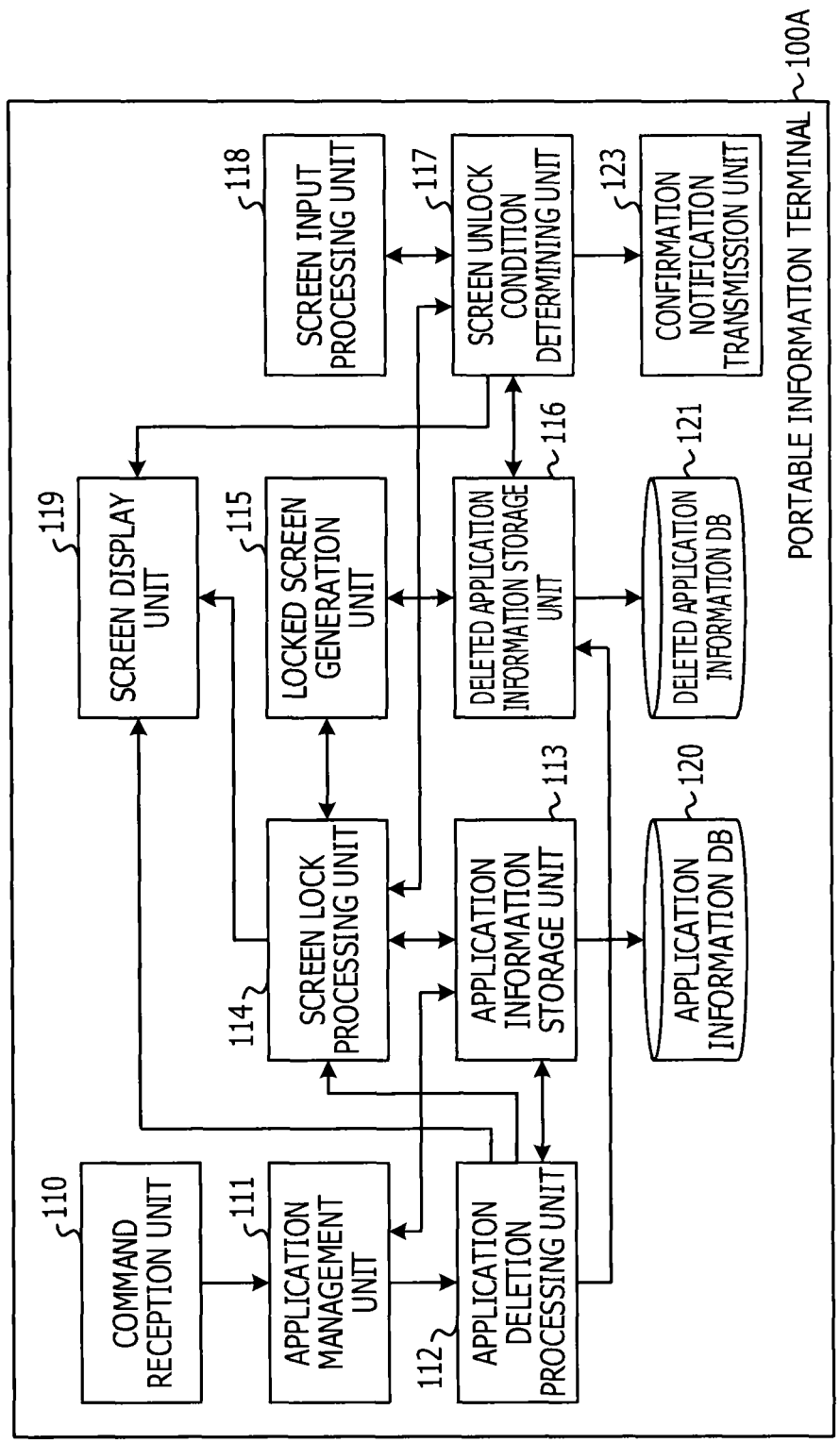
FIG. 10 is a schematic diagram of functional blocks in a portable information terminal according to a second embodiment.

FIG. 10 is a schematic diagram of functional blocks in a portable information terminal 100A according to the second embodiment.

As illustrated in FIG. 10, the portable information terminal 100A according to the present embodiment further includes a confirmation notification transmission unit 123 as a processing unit, in the portable information terminal 100 according to the first embodiment. The confirmation notification transmission unit 123 is realized by the CPU 101 reading the control program 1000 to the main memory 102 and executing the control program 1000 that has been read in the main memory 102.

The confirmation notification transmission unit 123 transmits the completion notification of the deletion confirmation to the server 200, based on the deletion confirmation from the screen unlock condition determining unit 117. Therefore, the server 200 may recognize that the user of the portable information terminal 100 has performed the deletion confirmation, based on the completion notification of the deletion confirmation from the portable information terminal 100. The status of the deletion confirmation for each user that has been recognized by the server 200 may be used for monitoring the security behavior of each user.

Third Embodiment

Hereinafter, a third embodiment will be described with reference to FIG. 11. However, here, it is assumed that the description of the same components and operations as in the first and second embodiments will be omitted.

Figure 11:
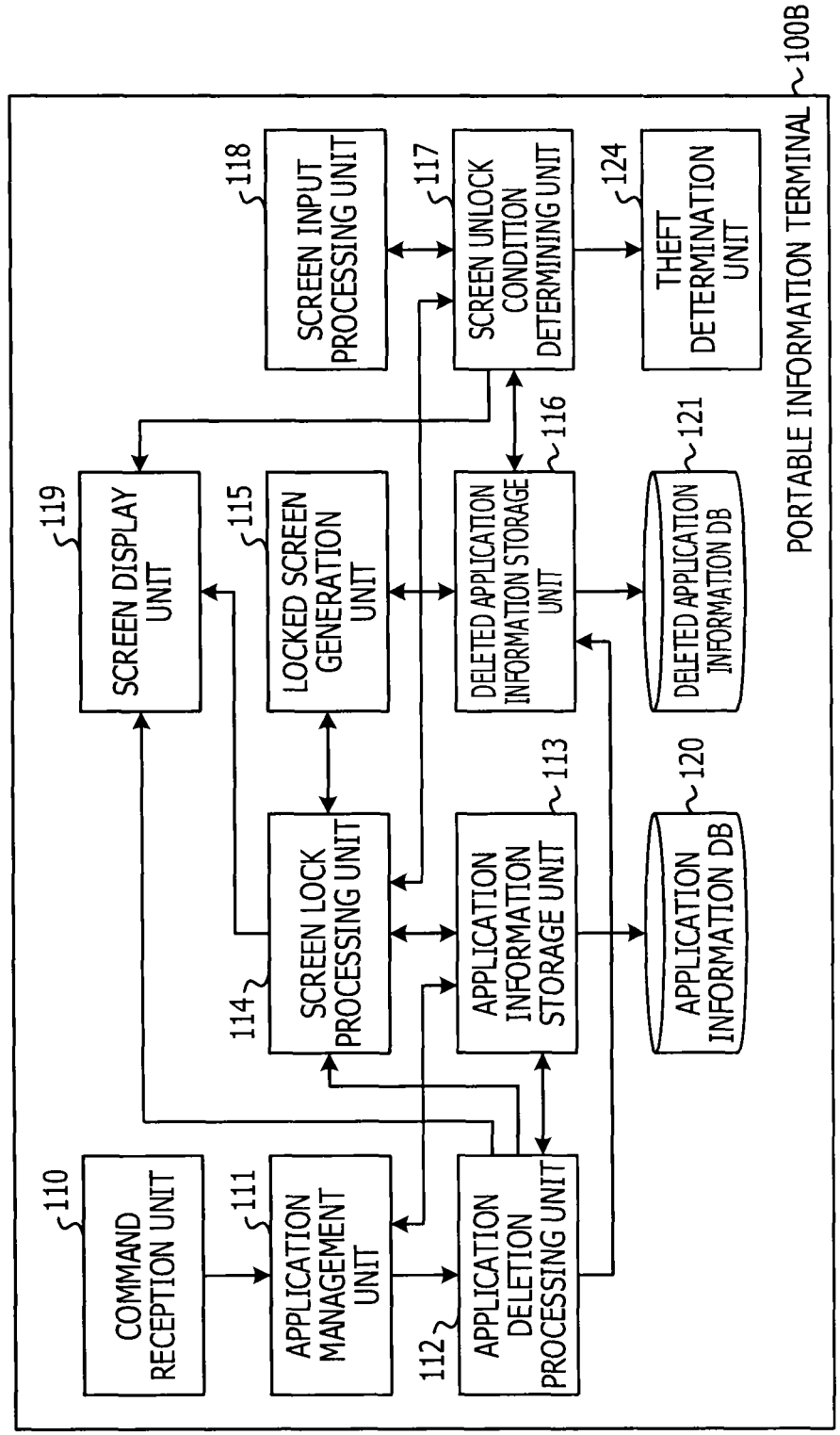
FIG. 11 is a schematic diagram of functional blocks in a portable information terminal according to a third embodiment.

FIG. 11 is a schematic diagram of functional blocks in a portable information terminal 100B according to the third embodiment.

As illustrated in FIG. 11, the portable information terminal 100B according to the present embodiment further includes a theft determination unit 124 as a processing unit, in the portable information terminal 100 according to the first embodiment. The theft determination unit 124 is realized by the CPU 101 reading the control program 1000 to the main memory 102 and executing the control program 1000 that has been read in the main memory 102.

The theft determination unit 124 determines whether or not the portable information terminal 100 has been stolen, based on the time elapsed until the deletion confirmation of the deleted applications is performed since the application information regarding the deleted application has been deleted from the application information DB 120. When it is determined that the portable information terminal 100 has been stolen, the theft determination unit 124 resets the portable information terminal 100, in other words, sets the portable information terminal 100 to a state immediately after shipment. Therefore, according to the present embodiment, even when the portable information terminal 100 is stolen, it is possible to avoid a thief's free operation of the portable information terminal 100.

Fourth Embodiment

Hereinafter, a fourth embodiment will be described with reference to FIG. 12. However, here, it is assumed that the description of the same components and operations as in the first to third embodiments will be omitted.

Figure 12:
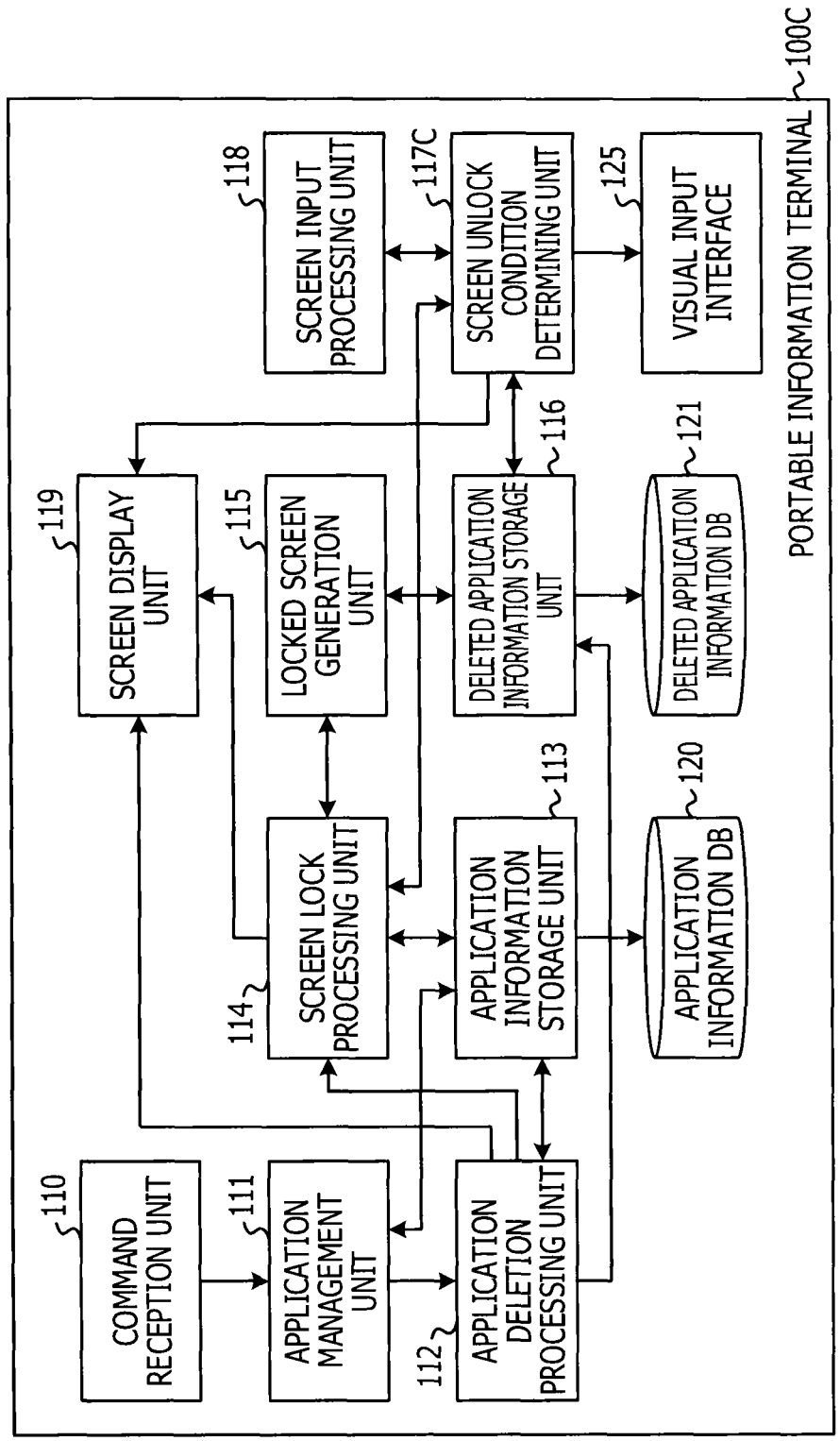
FIG. 12 is a schematic diagram of functional blocks in a portable information terminal according to a fourth embodiment.

FIG. 12 is a schematic diagram of functional blocks in a portable information terminal 100C according to the fourth embodiment.

As illustrated in FIG. 12, the portable information terminal 100C according to the present embodiment further includes a visual input interface 125 as a processing unit, in the portable information terminal 100 according to the first embodiment. The visual input interface 125 is realized by the CPU 101 reading the control program 1000 to the main memory 102 and executing the control program 1000 that has been read in the main memory 102.

The visual input interface 125 detects at least one of the position and movement of the user's eyes, based on input information from a camera which is the operation device 105. The screen unlock condition determining unit 117C determines whether or not the deletion confirmation of the application has been performed, based on at least one of the position and movement of the user's eyes from the visual input interface 125. Therefore, according to the present embodiment, it is possible to realize the deletion confirmation by the visual input instead of the operation of dragging the deleted application icon to the recycle bin icon.

In the present embodiment, at least one of the position and movement of the user's eyes is used in order to determine whether or not the deletion confirmation of the application has been performed. However, the present embodiment is not limited to the position and movement of the user's eyes, and it is possible to use any sensor input. For example, whether or not the of the application has been performed may be determined based on input information (such as audio information) from a microphone which is the operation device 105. Further, whether or not the deletion-e confirmation of the application has been performed may be determined based on input information about an acceleration sensor or a gyro sensor which is the operation device 105, in other words, the movement of the portable information terminal 100.

Fifth Embodiment

Hereinafter, a fifth embodiment will be described with reference to FIG. 13. However, here, it is assumed that the description of the same components and operations as in the first to fourth embodiments will be omitted.

Figure 13:
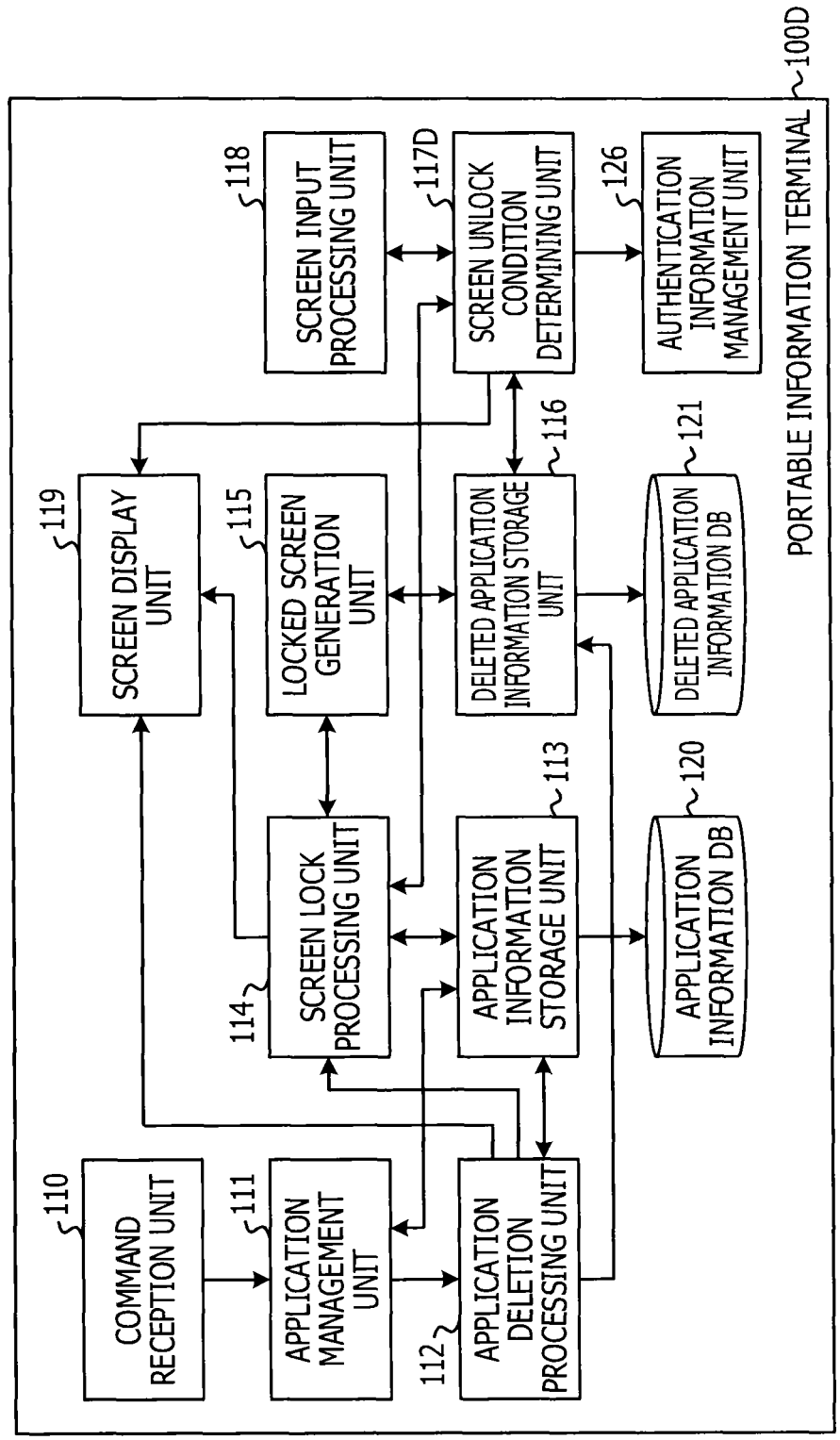
FIG. 13 is a schematic diagram of functional blocks in a portable information terminal according to a fifth embodiment.

FIG. 13 is a schematic diagram of functional blocks in a portable information terminal 100D according to the fifth embodiment.

As illustrated in FIG. 13, the portable information terminal 100D according to the present embodiment further includes an authentication information management unit 126 as a processing unit, in the portable information terminal 100 according to the first embodiment. The authentication information management unit 126 is realized by the CPU 101 reading the control program 1000 to the main memory 102 and executing the control program 1000 that has been read in the main memory 102.

The authentication information management unit 126 stores authentication information that has been input in advance by the user of the portable information terminal 100, for example, trajectory information when the user drags the deleted application icon to the recycle bin icon. For example, an S shape, one quick rotation, and the like may be used as the trajectory information. The screen unlock condition determining unit 117D generates trajectory information when the user drags the deleted application icon to the recycle bin icon, based on input information from the screen input processing unit 118. The screen unlock condition determining unit 117D performs the authentication of the user, based on the result of comparison between the trajectory information that is generated by using the input information from the screen input processing unit 118 and trajectory information that is stored in the authentication information management unit 126. Therefore, according to the present embodiment, it is possible to perform the authentication, without increasing the operation burden of the user, by combining the authentication operation with the deletion confirmation operation.

In the present embodiment, the trajectory information about dragging the icon is used as the input information, but the present embodiment is not limited thereto. For example, when double-clicking is employed as the operation manner for the deletion confirmation, for example, a click interval of the icon of the deleted application may be used instead of the trajectory information about dragging. Alternatively, for example, the order of deleting the application has been stored as the deleted application information, and if the user does not perform the deletion confirmation in the deleted order, the user may not be determined as a true user. This manner uses as the basis of identification, the fact that the user knows the deleted order of the applications, because the user knows his or her behavior history.

If the user fails in the authentication, the application information storage unit 113 may delete all pieces of the application information in the application information DB 120, or reset the portable information terminal 100, in other words, set the portable information terminal 100 to a state immediately after shipment.

Sixth Embodiment

Hereinafter, a sixth embodiment will be described with reference to FIGS. 14 and 15. However, here, it is assumed that the description of the same components and operations as in the first to fifth embodiments will be omitted.

Figure 14:
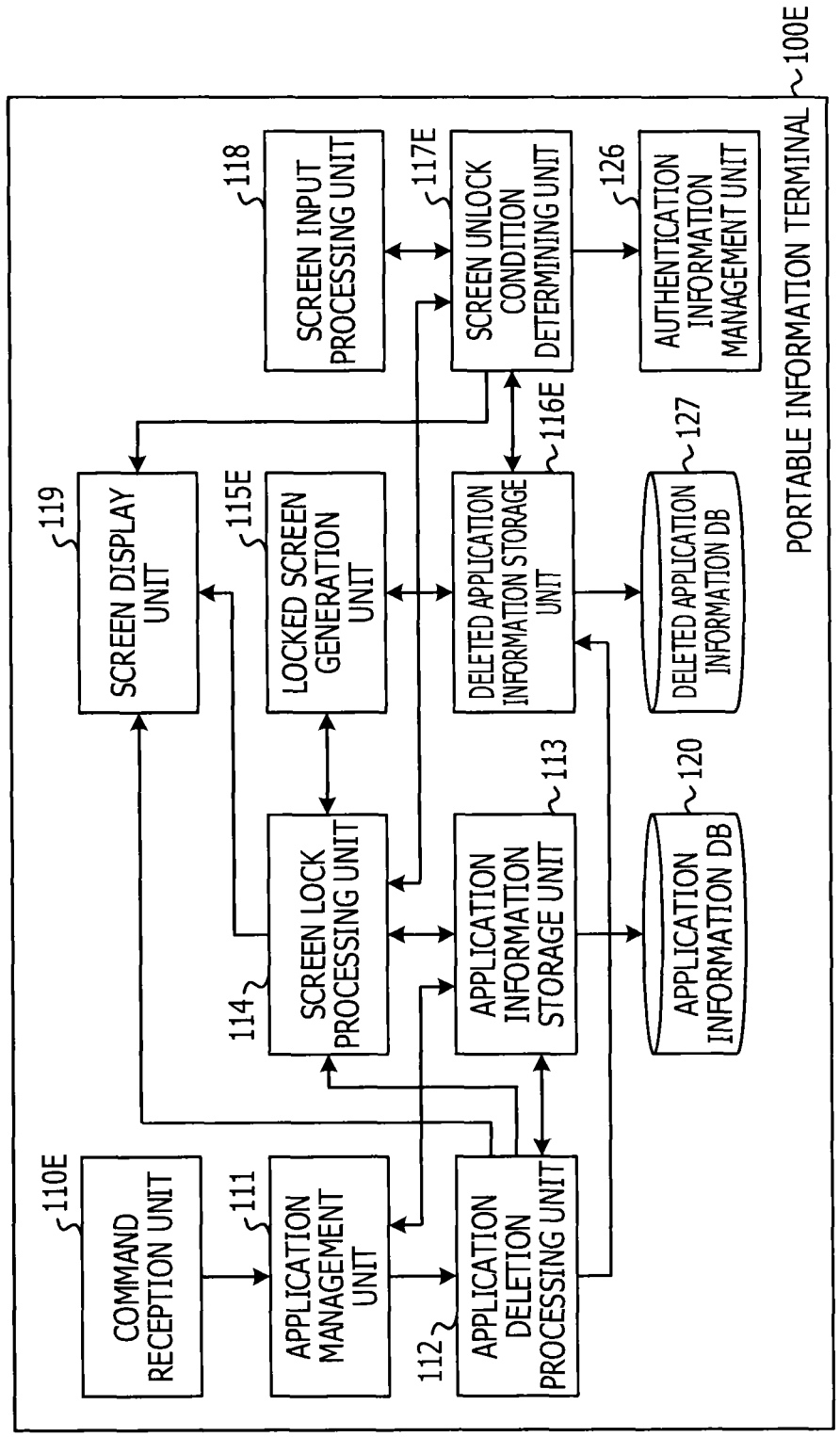
FIG. 14 is a schematic diagram of functional blocks in a portable information terminal according to a sixth embodiment.

FIG. 14 is a schematic diagram of functional blocks in a portable information terminal 100E according to the sixth embodiment. FIG. 15 is a schematic diagram of a deleted application information DB 127 according to the sixth embodiment.

As illustrated in FIG. 14, the deleted application information DB 127 further stores information regarding the location where the deleted application is downloaded (hereinafter, referred to as location information) in the deleted application information DB 121 according to the first embodiment. The location information is the name of the location where the portable information terminal 100 is positioned when the application is downloaded, for example, a meeting room OO, and the like.

When the deleted application icon is dragged to the recycle bin icon, the screen unlock condition determining unit 117E instructs the deleted application information storage unit 116E to acquire location information associated with the deleted application. The deleted application information storage unit 116E acquires the location information associated with the deleted application, with reference to the deleted application information DB 127, based on the instruction from the screen unlock condition determining unit 117E. The screen unlock condition determining unit 117 acquires the location information associated with the deleted application, from the deleted application information storage unit 116E, and generates a message, for example, the present application may be used if you go to OO", based on the location information. Thus, the screen display unit 119 displays the message on the display 104. Therefore, the user of the portable information terminal 100 may again acquire and use the application, by behaving according to the message.

The screen unlock condition determining unit 117E according to the present embodiment presents a message when the deleted application icon is dragged to the recycle bin icon. However, for example, when the unlock input is determined to have been detected, the message may be presented.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A control method executed by an information processing apparatus including a display, the control method comprising:
    deleting an application that is installed in the information processing apparatus;
    displaying a first screen for unlocking on the display, the first screen including an icon corresponding to the application and a message indicating an operation request for deleting the icon, when an input for releasing limitation of an input operation to the display is detected; and
    displaying, when an operation for deleting the icon of the application displayed on the first screen in response to the message is detected, a second screen different from the first screen on the display, the second screen excluding the icon corresponding to the application and to which input operations are not limited.

2. The control method according to claim 1, further comprising:
    storing application information for identifying the application in a memory; and
    deleting the application information that is stored in the memory, when the operation for deleting the icon of the application displayed on the first screen is detected.

3. The control method according to claim 2, further comprising:
    determining whether to limit an operation to be performed on the information processing apparatus, based on a time elapsed until a deletion confirmation of the deleted application is started since the application information regarding the deleted application has been deleted from the memory.

4. The control method according to claim 3, wherein the determining includes determining whether to reset the information processing apparatus to an initial state.

5. The control method according to claim 1, further comprising:
transmitting, to a server, a completion notification indicating a confirmation about the deletion of the application, when the operation for deleting the icon of the application displayed on the first screen is detected.

6. The control method according to claim 1, further comprising
displaying, on the display, a third screen to which input operations are limited, when the application is deleted.

7. The control method according to claim 6, wherein the third screen includes a lock icon indicating that the third screen is locked.

8. The control method according to claim 7, wherein the input for releasing limitation of the input operations is detected when a touch input to the lock icon is detected.

9. An information processing apparatus comprising:
a display; and
a processor coupled to the display and configured to:
delete an application that is installed in the information processing apparatus;
display a first screen for unlocking on the display, the first screen including an icon corresponding to the application and a message indicating an operation request for deleting the icon, when an input for releasing limitation of an input operation to the display is detected; and
display, when an operation for deleting the icon of the application displayed on the first screen in response to the message is detected, a second screen different from the first screen on the display, the second screen excluding the icon corresponding to the application and to which the input operations are not limited.

10. The information processing apparatus according to claim 9, wherein
the operation for deleting the icon is detected by acquiring information regarding at least one of a position and a movement of a user's eyes.

11. A non-transitory computer-readable storage medium storing a program that causes an information apparatus that includes a display to execute a process, the process comprising:
deleting an application that is installed in the information processing apparatus;
displaying a first screen for unlocking on the display, the first screen including an icon corresponding to the application and a message indicating an operation request for deleting the icon, when an input for releasing limitation of an input operation to the display is detected; and
displaying, when an operation for deleting the icon of the application displayed on the first screen in response to the message is detected, a second screen different from the first screen on the display, the second screen excluding the icon corresponding to the application and to which input operations are not limited.

* * * * *